United States Patent
Iceman et al.

(10) Patent No.: US 6,835,004 B2
(45) Date of Patent: Dec. 28, 2004

(54) OPTO-ELECTRONIC COMPONENT PACKAGING

(75) Inventors: Jason T. Iceman, Allentown, PA (US); Walter Jeffery Shakespeare, Macungie, PA (US); John Kai Andersen, Emmaus, PA (US)

(73) Assignee: T-Networks, Inc., Allentown, PA (US)

( * ) Notice: Subject to any disclaimer, the term of this patent is extended or adjusted under 35 U.S.C. 154(b) by 226 days.

(21) Appl. No.: 10/228,650

(22) Filed: Aug. 26, 2002

(65) Prior Publication Data

US 2003/0202755 A1 Oct. 30, 2003

Related U.S. Application Data

(60) Provisional application No. 60/375,163, filed on Apr. 24, 2002.

(51) Int. Cl.[7] .............................. G02B 6/36; G02B 6/42; H01L 23/495; H05K 5/00
(52) U.S. Cl. ........................... 385/92; 385/14; 361/704; 361/707; 361/715; 257/694; 257/678; 257/704; 257/706; 257/731; 257/676; 257/728; 174/50.52; 174/52.1
(58) Field of Search ................................ 361/704, 707, 361/715, 783, 820, 717; 385/92–94, 14; 257/676, 728, 694; 174/50.52, 54.54, 52.1

(56) References Cited

U.S. PATENT DOCUMENTS 5,995,261 A * 11/1999 Asous ........................ 398/182
6,270,263 B1    8/2001  Iwase et al.
6,364,540 B2    4/2002  Shishikura et al.
6,623,180 B2 *  9/2003  Panicker et al. .............. 385/92
2003/0039456 A1 * 2/2003 Tajima ......................... 385/92
2003/0161593 A1 * 8/2003 Stackhouse .................. 385/92

OTHER PUBLICATIONS

JDS Uniphase Corporation; Broadband (Fabry–Perot) Wavelength Locker; Product Bulletin; Rev. 001; 11/01.

* cited by examiner

*Primary Examiner*—David V. Bruce
*Assistant Examiner*—Krystyna Suchecki
(74) *Attorney, Agent, or Firm*—RatnerPrestia

(57) ABSTRACT

An opto-electronic package is provided for mounting on a module base. The package comprises a generally rectangular package. An optical connector extends from a first side of the package body along an optical axis, generally parallel to the module base. A radio frequency connector extends from a second side of the package body along a RF axis, generally parallel to the module base. A plurality of electronic leads and mounting tabs each extend from at least one of the second side and a third side of the package body. A fourth side of the package body is adjacent the first side and free of connectors, leads, and mounting tabs for mounting the package in a corner of the module formed by first and second module walls. The fourth wall of the package body is positioned adjacent the first module wall and the optical connector extends through the second module wall.

19 Claims, 5 Drawing Sheets

OPTO-ELECTRONIC COMPONENT PACKAGING

CROSS-REFERENCE TO RELATED APPLICATIONS

This application claims the benefit of the priority date of Provisional Patent Application No. 60/375,163, filed Apr. 24, 2002.

TECHNICAL FIELD

This invention relates generally to packaging of opto-electronic devices, and more particularly to a method and apparatus for packaging an opto-electronic device providing increased packaging density within a module.

BACKGROUND OF THE INVENTION

Opto-electronic packages (or devices), that require both radio frequency (RF) and optical connectors, are used in the communications industry. For example, transponders receive RF signals and provide an optical output signal corresponding to the RF input signal. Accordingly, transponders typically include a device, such as an electroabsorptive-modulated laser (EML) to convert a RF signal to an optical signal.

A typical form factor for an existing EML package 10, widely used throughout the communications industry, is shown in FIG. 1. Existing EML package 10 includes a generally rectangular body 11 having a chip (not shown) therein, comprising a laser and a modulator. An optical connector 12 extends from one of the short sides of the rectangular body, for connection of an optical fiber which receives the optical output signal from the EML. A coaxial RF connector 14 extends from one of the long sides of the rectangular body for connection of a coaxial cable which provides a RF input signal to the EML. Seven electronic leads 16 extend from the opposite long side of the rectangular body opposite RF connector 14 for providing operational power and signal used to implement or control various functions such as biasing the chip, thermal electric cooling of the laser, temperature sensing, and monitoring the optical signal. Mounting tabs 18 extend from the bottom of each short side of rectangular body for mounting the EML package.

The increased integration and density of communication equipment creates pressure for providers of equipment such as transponders to design and manufacture their products with continually smaller form factors. This pressure greatly increases the value of "real estate" (or space) within equipment such as transponders. Currently, the industry is trying to save every square millimeter possible from each device and component in a transponder. Accordingly, a need exists for opto-electronic packages with more compact form factors to increase packing density within modules in which they are mounted.

SUMMARY OF THE INVENTION

To meet these and other needs, and in view of its purposes, an exemplary embodiment of the present invention provides an opto-electronic package for mounting on a module base and providing increased packing density compared to existing modules. The package is generally rectangular. An optical connector extends from a first side of the package body along an optical axis, generally parallel to the module base. A radio frequency connector extends from a second side of the package body along a RF axis, generally parallel to the module base. A plurality of electronic leads and mounting tabs each extend from at least one of the second side and a third side of the package body. A fourth side of the package body is adjacent the first side and is free of connectors, leads, and mounting tabs for mounting the package in a corner of the module formed by first and second module walls. The fourth wall of the package body is positioned adjacent the first module wall and the optical connector extends through the second module wall.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
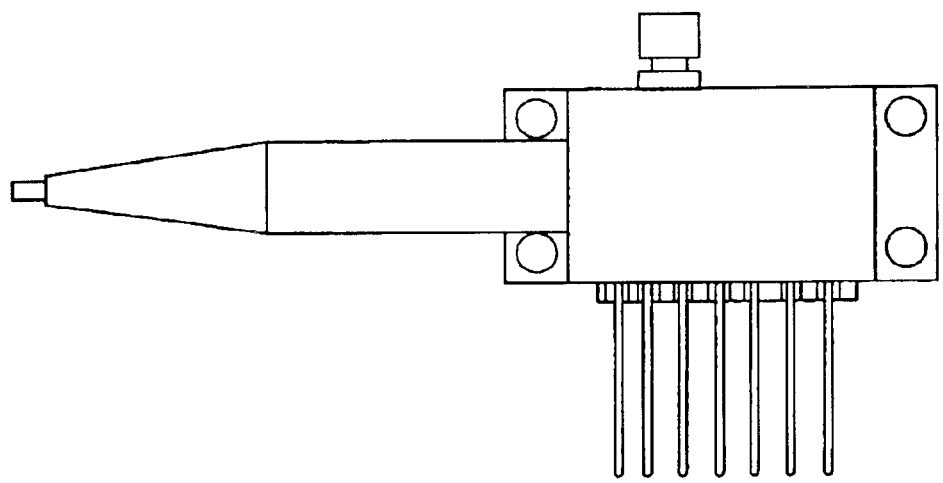
FIG. 1 is a top plan view standard electroabsorptive modulated laser package.
Figure 2:
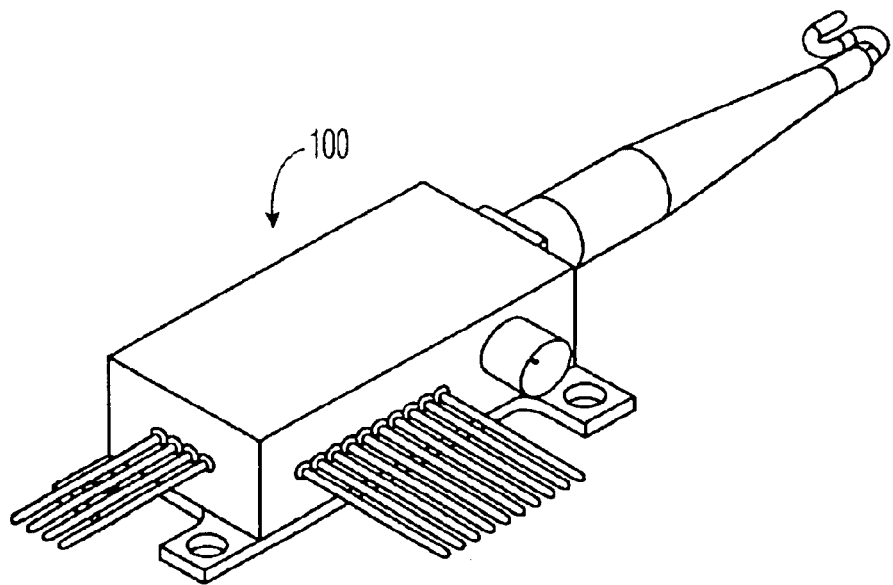
FIG. 2 is a perspective view of an opto-electronic package according to an exemplary embodiment of the invention.
Figure 4:
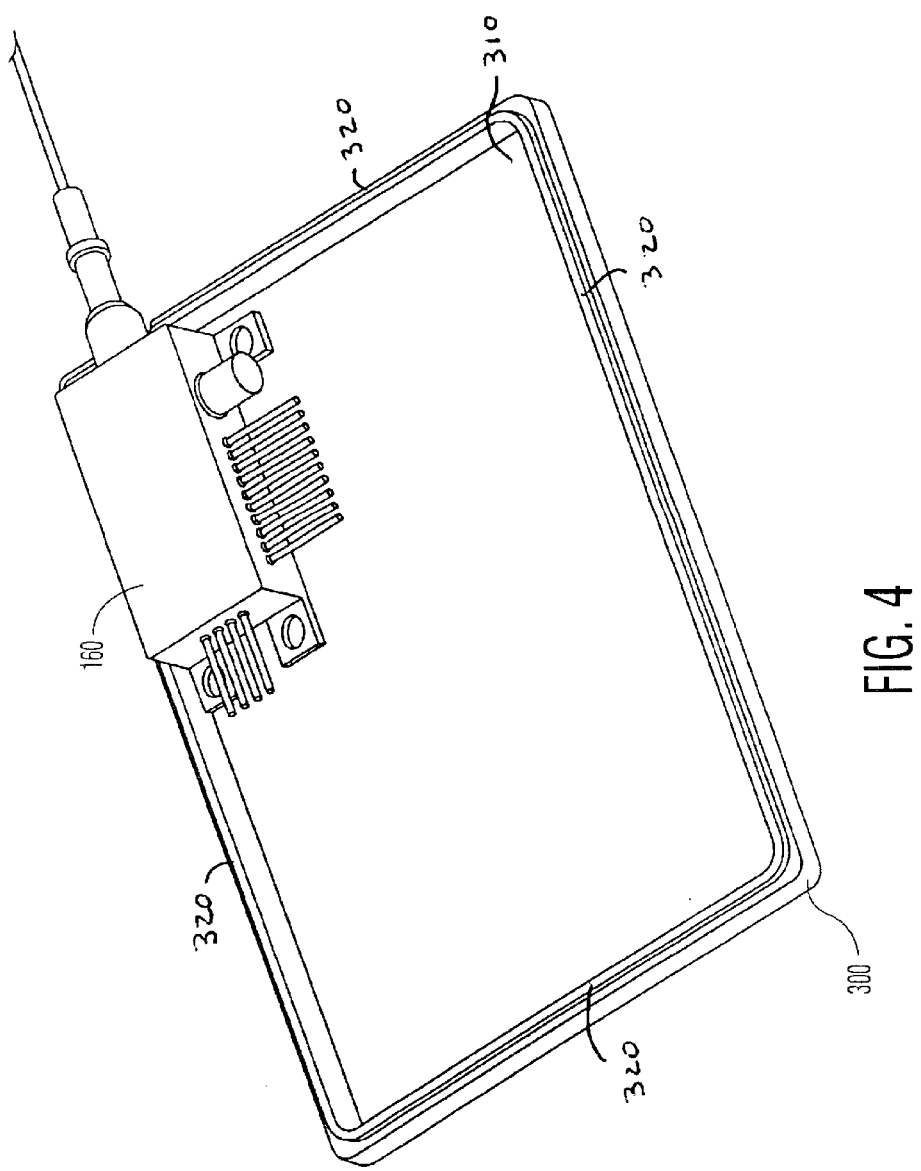
FIG. 4 is a perspective view of a module base with the opto-electronic package of FIG. 2 positioned in a corner of the module according to an exemplary embodiment of the invention.
Figure 5:
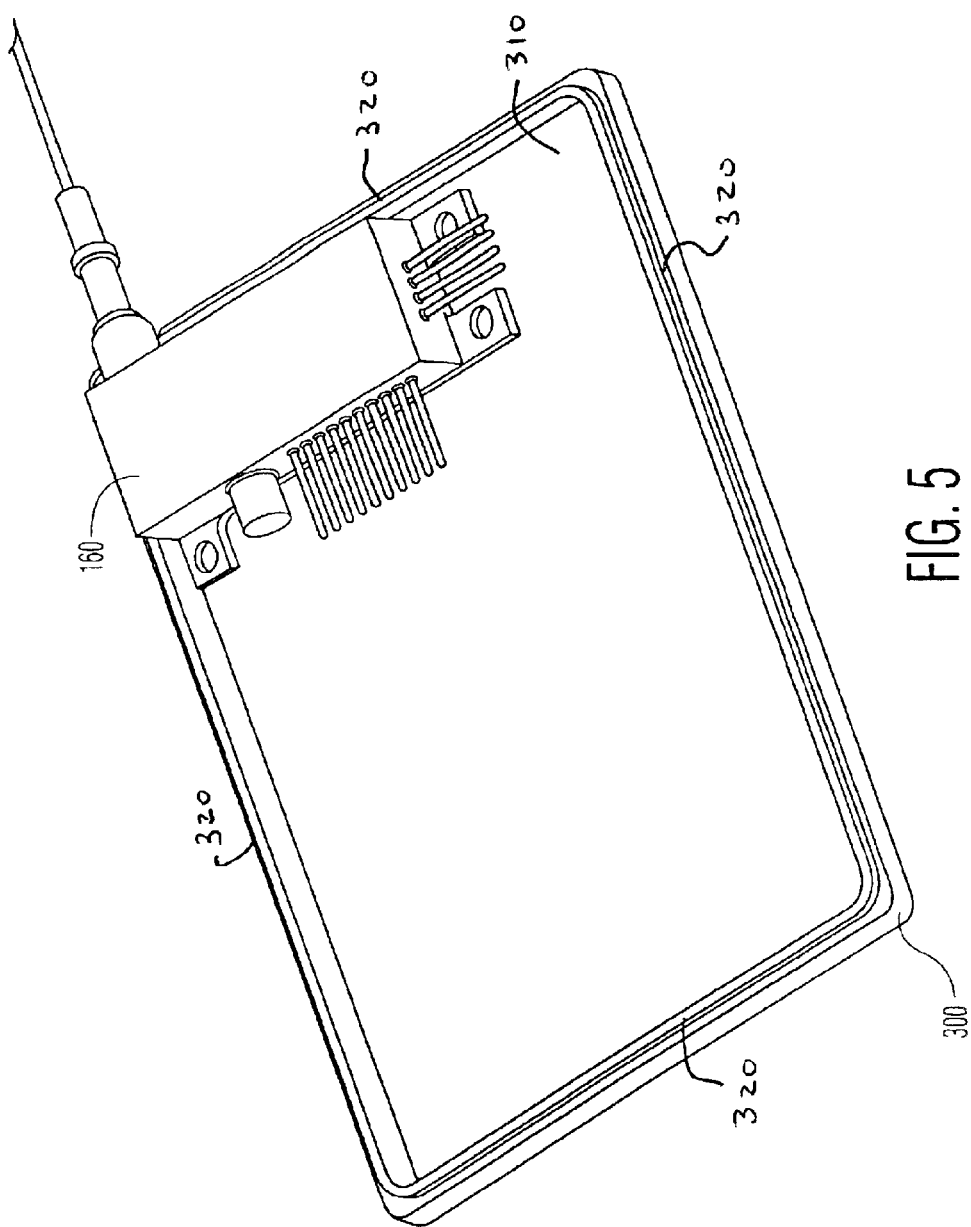
FIG. 5 is a perspective view of a module base with an alternative exemplary opto-electronic package positioned in a corner of the module according to another exemplary embodiment of the invention.

Referring now to the drawing, in which like reference numbers refer to like elements throughout, FIG. 2 shows an opto-electronic package 100 according to an exemplary embodiment of the invention which provides increased packing density in a module, such as a transponder. In an exemplary embodiment, the opto-electronic package is mounted to the base 300 of a module (as shown in FIGS. 4 and 5). Base 300 has a generally flat bottom surface 310 configured for mounting boards and devices thereon, and four module walls 320.

Figure 6:
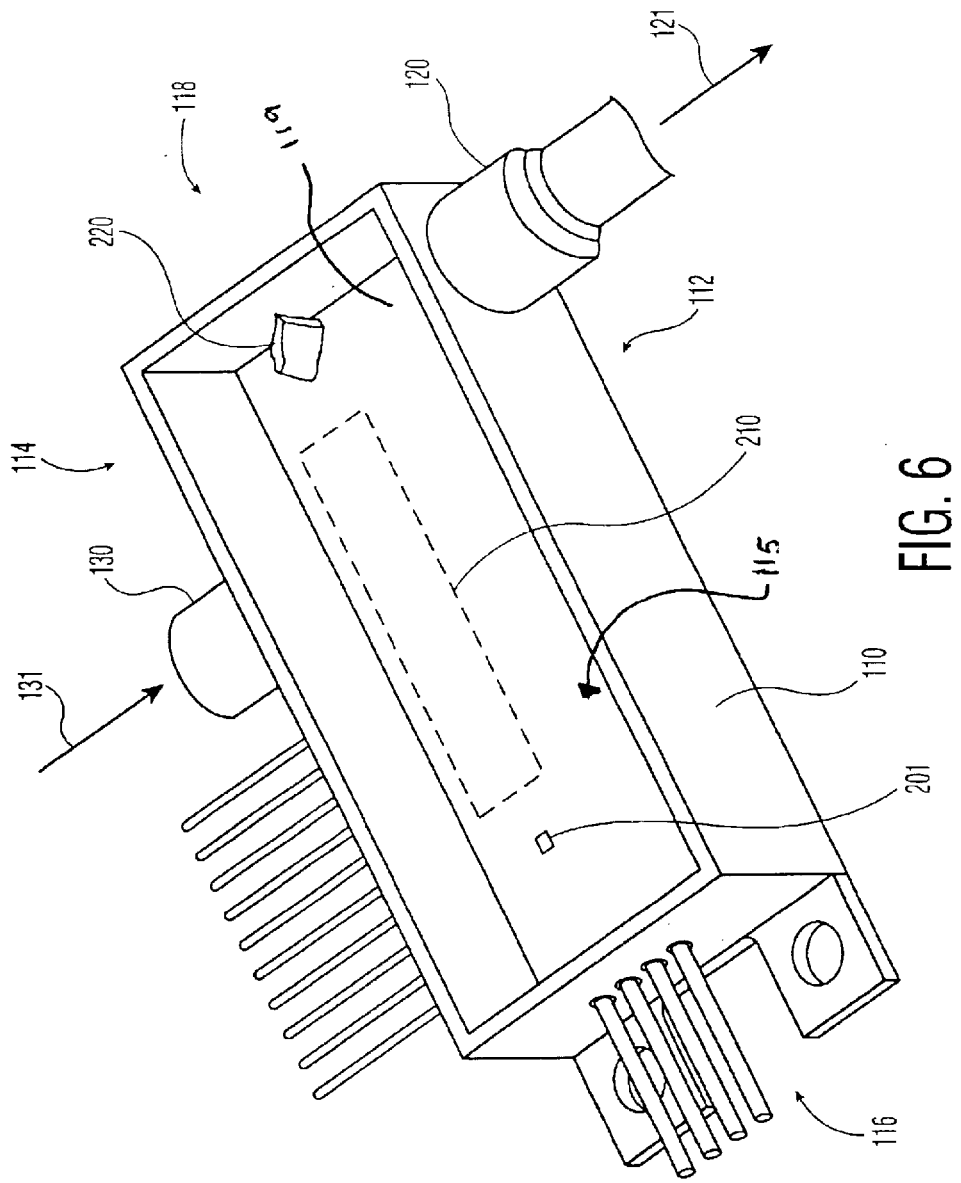
FIG. 6 is a perspective view of the opto-electronic package shown in FIG. 5 with the lid removed.

Opto-electronic package 100 comprises a generally rectangular body 110 having a rectangular opening 115 (as shown in FIG. 6) to accommodate components such as a laser 201 (shown in FIG. 6) and a modulator (not shown). Rectangular opening 115 is bounded and defined by four generally vertical sides 112, 114, 116, and 118, and body bottom 119. Body 110 may be formed from any material suitable for housing a laser using any suitable manufacturing method. For example, material for body 110 may be chosen for good thermal stability, high thermal conductivity for dispersing heat from the laser, mechanical strength, low permeability, good hermetic sealing properties, and machinability. Body 110 may be formed using manufacturing methods such as molding, machining, electron discharge machining, and the like.

In an exemplary embodiment, body 110 comprises KOVAR® (available from CRS Holdings, Inc. of Wilmington, Del.) machined to form rectangular opening 115. Package body 110 has a length, not including mounting tabs, of about 25.5 mm a width, not including mounting tabs, of about 12.7 mm, and a height, including a lid, of about 8 mm.

Figure 3:
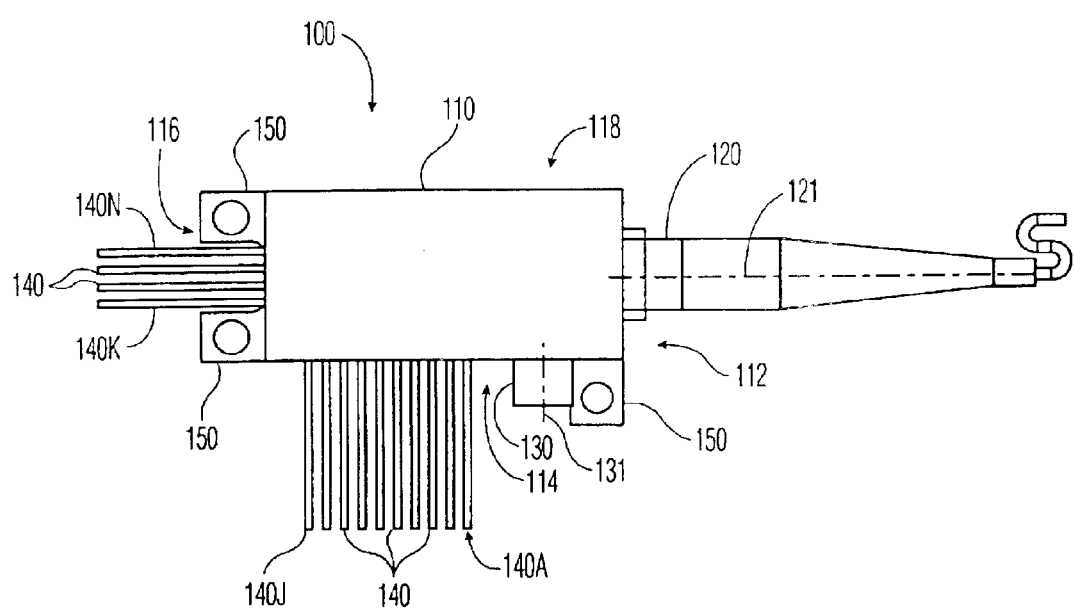
FIG. 3 is a top plan view of the opto-electronic package of FIG. 2.

An optical connector 120 extends from a first side 112 of package 100 along an optical axis 121 (shown in FIGS. 3 and 6). The optical axis is generally parallel to the bottom 310 of module base 300 (shown in FIGS. 4 and 5). Optical connector 120 may be any connector appropriate for terminating a fiber optic cable to receive an optical signal, as is known in the art. As shown in FIGS. 4 and 5, optical connector 120 preferably extends through a first one of module sidewalls 112, for carrying an optical signal to a location external the module. In an exemplary embodiment of the invention, optical connector 120 extends from package body such that optical axis is at a height of about 5.066 mm.

A radio frequency connector 130 extends from a second side 114 of package 100 along a RF axis 131 (shown in FIGS. 3 and 6). The second side 114 of package 100 may be opposite or adjacent the first side 112 of package 100 having the optical connector 120 extending from it. RF axis 131 is generally parallel to module base 300 (shown in FIGS. 4 and 5). When the second side 114 of package 100 is opposite the first side 112 of package 100, as shown in FIG. 6, RF axis 131 is essentially parallel to optical axis 121. When the second side 114 of package 100 is adjacent the first side 112 of package 100, as shown in FIG. 3, RF axis 131 is essentially perpendicular to optical axis 121. RF connector 130 may be any connector suitable for carrying a RF signal used to modulate the optical signal from laser 201. In an exemplary embodiment of the invention, RF connector 130 is a GPO connector, part number A007-L44-01-030, available from Corning Gilbert of Glendale, Ariz. In this exemplary embodiment, RF connector 130 extends from package body 110 such that RF axis is at a height of about 5.211 mm relative to the bottom of the package body.

In an exemplary embodiment of the invention, a RF signal is introduced to package 100, and used to modulate the output of a laser 201 (shown in FIG. 6) in package 100. As shown in FIG. 6, one or more optional components 210 may be disposed in package 100 between laser 201 and optical connector 120. These components may include, but are not limited to lenses, optical isolators, optical amplifiers, electroabsorptive modulators, and the like. In order to align the optical axis 121 parallel to the RF axis 131, as shown in FIG. 6, the modulated optical signal is desirably re-directed. In an exemplary embodiment of the invention, the modulated optical signal is re-directed by a mirror 220. It is contemplated, however, that other means of re-directing the modulated optical signal are possible, such as, by using a planer wave-guide, or other structure used for directing or guiding optical signals.

A plurality of electronic leads 140 extend from at least one of second side 114 of the package body 110 and a third side 116 of the package body 110. Third side 116 of package body 110 is adjacent second side 114 of package body 110. Leads 140 may be used to provide electrical connections between the package 100 and external electronics. Leads 140 may be used for grounding, such as frame ground, laser ground and back detector ground; for carrying operational voltage or signal into package 100 for functions such a silicon optical amplifier (SOA) power, variable optical attenuator (VOA) power, electroabsorptive modulator (EA) bias, laser bias, and thermal electric cooling (TEC) power; and for carrying voltage signals out of package 100, for functions such as temperature sensing for laser 201, back detectors, and signal monitoring.

In an exemplary embodiment of the invention, ten (10) leads (i.e., pins)140A–140J extend from second side 114 of package body 110 for connection to a power and control board. The first pin 140A provides voltage to power a SOA, the second pin 140B is not connected, the third pin 140C provides a bias for a electroabsorptive modulator, the fourth pin 140D is a first tap, the fifth pin 140E is a second tap, the sixth pin 140F is grounded to the frame or package body, the seventh pin 140G provides a bias voltage to laser 201, the eighth pin 140H provides grounding to laser 201 and a back detector, the ninth pin 140I provides a first voltage signal to the back detector, and the tenth pin 140J provides a second voltage signal to the back detector. In this exemplary embodiment of the invention four (4) additional leads 140K–140N extend from third side 116 of package body 110. The eleventh lead 140K is a voltage return for a thermal electric cooler (TEC), the twelfth pin 140L is a voltage return for a thermistor, the thirteenth pin 140M provides voltage to the thermistor, and the fourteenth pin 140N provides voltage to the TEC. Exemplary pins 140A–140N are about 0.381 mm in width, have a center spacing of about 1.27 mm, and extend from package body 110 at a height of about 4.56 mm.

Mounting tabs 150 extend from the bottom of at least one of second side 114 and third side 116 of package body 110. Mounting tabs 150 are generally flat extensions having mounting holes therein to receive mounting hardware, such as screws for mounting package 100 to, for example, module base 300. In an exemplary embodiment of the invention, two (2) mounting tabs extend from third side 116, giving package 100 an overall length of about 30.0 mm, and one (1) mounting tab extends from second side 114, giving package 100 an overall width of 17.2 mm. As shown in FIG. 3, mounting tabs 150 are preferably located at corners of package body 110.

A fourth side 118 of package body 110 is free of connectors, leads, and mounting tabs. As shown in FIGS. 3 and 6, fourth side 118 is adjacent first side 112 of the package body for mounting package 100 in a corner of module base 300. Fourth side is proximate, and preferably against a first wall of the module in a corner of the module formed by the first wall and a second wall, and optical connector 120 extends through the second wall of module base 300. In this way, packing density within the module is increased, because first side 112 and fourth side 118 of package body 110 may be positioned proximate, and preferably against, adjacent walls of the module. Spacing does not need to be provided adjacent the fourth side of package body 110 because it does not have connectors, leads, or mounting tabs extending from it. The optical connector does not consume space within the module, because it desirably extends directly out of the module.

In an exemplary embodiment of the invention, package 100 is mounted directly onto module base 300, so that heat may be dissipated from package body 110 through module base 300 by thermal conduction. Leads 150 are bent downwardly and outwardly to align with contact pads on one or more printed circuit boards, flex circuits, or the like. A lid 160 is hermetically sealed to package body 110, at the top of package sidewalls 112, 114, 116, and 118 to protect components within the package from moisture. In an exemplary embodiment laser 201 is an Indium Phosphide, Distributed Feedback (DFB) laser diode whose output is modulated by an electroabsorptive modulator.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. For example, instead of the package body being mounted in contact with the module base, the package layout may be the mirror image of the layout shown with the lid being mounted to the module base, and the top of the module or a heat sink in contact with the package body to dissipate heat. In such an embodiment, the mounting tabs may be positioned away from printed circuit board or flex circuit to which the leads are connected.

What is claimed:

1. An opto-electronic package for mounting on the base of a module, the package comprising:

a generally rectangular package body comprising four sides and a bottom defining a generally rectangular opening;

an optical connector extending from a first side of the package body along an optical axis, the optical axis being generally parallel to the base of the module;

a radio frequency connector extending from a second side of the package body along an RF axis, the RF axis being generally parallel to the base of the module;

a plurality of electronic leads extending from at least one of the second side of the package body and a third side of the package body;

mounting tabs extending from the bottom of at least one of the second side and the third side of the package body; and a fourth side of the package body, adjacent the first side of the package body and free of connectors, leads, and mounting tabs for mounting against a first wall of the module in a corner of the module formed by the first wall and a second wall with the optical connector extending from the second wall of the module.

2. The opto-electronic package of claim 1 wherein the optical axis is essentially perpendicular to the RF axis.

3. The opto-electronic package of claim 1 wherein the optical axis is essentially parallel to the RF axis.

4. The opto-electronic package of claim 1 further comprising a lid hermetically sealed to the top of the package, the lid being free of connectors, leads, and mounting tabs.

5. The opto-electronic package of claim 1 further comprising a laser disposed within the package body and functionally connected to the optical connector to provide an optical output signal at the optical connector.

6. The opto-electronic package of claim 5 further comprising a bottom configured to dissipate heat from the laser to the base of the module.

7. The opto-electronic package of claim 6 wherein the laser generates an optical output that is modulated using an RF input signal received at the RF connector to provide a modulated optical output signal to the optical connector.

8. The opto-electronic package of claim 7 wherein the laser is aligned with the optical connector along the optical axis.

9. The opto-electronic package of claim 7 further comprising a mirror wherein the mirror reflects the modulated optical output signal along the optical axis.

10. A laser integrated module package, comprising:

a generally rectangular package body having a bottom and four sidewalls; a fourth one of the sidewalls being free of connectors, leads, and mounting tabs;

an optical connector extending from a first one of the sidewalls generally parallel to the bottom of the package body;

a RF connector extending from a second one of the sidewalls generally parallel to the bottom of the package body;

a plurality of electronic leads extending from the second one of the side walls and a third one of the side walls; and mounting tabs extending from the bottom of at least one of the second one of the sidewalls and the third one of the sidewalls.

11. The laser integrated module package of claim 10, further comprising a lid, the lid being hermetically sealed to the top of the four sidewalls and being free of connectors, leads, and mounting tabs.

12. The laser integrated module package of claim 10 wherein the package body is adapted to accommodate a laser diode, the output of the laser diode being modulated using an RF signal which is received at the RF connector to provide a modulated optical signal corresponding to the RF input, the modulated optical signal being provided to the optical connector.

13. The laser integrated module package of claim 12 wherein the RF connector extends along a RF axis and the optical connector extends along an optical axis generally perpendicular to the RF axis.

14. The laser integrated module package of claim 12 wherein the RF connector extends along an RF axis and the optical connector extends along an optical axis generally parallel to the RF axis.

15. A transponder module comprising:

a generally rectangular base having a bottom and four module side walls; and a generally rectangular electroabsorbtive modulated laser package mounted on the base and having two adjacent package side walls each being proximate one of two adjacent module side walls, the package being configured such that an optical connector extends from one of the two adjacent package side walls and through the proximate module side wall along an optical axis generally parallel to the bottom of the base, the other one of the two adjacent package side walls being free of connectors, leads, and mounting tabs.

16. The transponder module of claim 15 wherein the electroabsorbtive modulated laser package has a package sidewall, which is not one of the two adjacent package sidewalls with a RF connector extending therefrom along a RF axis generally parallel to the bottom of the base.

17. The transponder module of claim 16 wherein the RF axis is perpendicular to the optical axis.

18. The transponder module of claim 16 wherein the RF axis is parallel to the optical axis.

19. The transponder module of claim 16 wherein a lid is hermetically sealed to the package sidewalls, the lid being free of connectors, leads, and mounting tabs.

* * * * *